(12) United States Patent
Feng (10) Patent No.: US 10,694,552 B2
(45) Date of Patent: Jun. 23, 2020

(54) METHOD AND APPARATUS FOR ESTABLISHING CONNECTION

(71) Applicant: GUANGDONG OPPO MOBILE TELECOMMUNICATIONS CORP., LTD., Dongguan, Guangdong (CN)

(72) Inventor: Bin Feng, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/767,030

(22) PCT Filed: Dec. 8, 2015

(86) PCT No.: PCT/CN2015/096720
§ 371 (c)(1),
(2) Date: Apr. 9, 2018

(87) PCT Pub. No.: WO2017/096535
PCT Pub. Date: Jun. 15, 2017

(65) Prior Publication Data
US 2018/0302936 A1    Oct. 18, 2018

(51) Int. Cl.
*H04W 76/10* (2018.01)
*H04W 72/04* (2009.01)
*H04W 74/08* (2009.01)

(52) U.S. Cl.
CPC .......... *H04W 76/10* (2018.02); *H04W 72/04* (2013.01); *H04W 74/0833* (2013.01)

(58) Field of Classification Search
CPC .. H04W 76/10; H04W 72/04; H04W 74/0833
See application file for complete search history.

(56) References Cited

U.S. PATENT DOCUMENTS

2008/0096563 A1   4/2008  Fischer
2009/0252119 A1  10/2009  Fischer
(Continued)

FOREIGN PATENT DOCUMENTS

CN   1809004 A   7/2006
CN   101523771 A   9/2009
(Continued)

OTHER PUBLICATIONS

International Search Report in international application No. PCT/CN2015/096720, dated Aug. 26, 2016.
(Continued)

*Primary Examiner* — Ajay Cattungal
(74) *Attorney, Agent, or Firm* — Ladas & Parry, LLP (57) ABSTRACT

A method and apparatus for establishing a connection are provided. The method includes: terminal equipment determines a connection establishment request format adopted when a connection establishment request message is sent from multiple connection establishment request formats; and the terminal equipment sends the connection establishment request message to network equipment according to the determined connection establishment request format. In such a manner, rapid connection establishment for different service requirements in multiple environments may be adapted.

17 Claims, 3 Drawing Sheets

100

Terminal equipment determines a connection establishment request format adopted for sending a connection establishment request message from multiple connection establishment request formats — S110

The terminal equipment sends the connection establishment request message to network equipment according to the determined connection establishment request format — S120

(56) References Cited

U.S. PATENT DOCUMENTS

| | | | | |
|---|---|---|---|---|
| 2010/0202288 | A1* | 8/2010 | Park | H04W 48/08 370/230 |
| 2010/0265854 | A1* | 10/2010 | Baldemair | H04W 74/0833 370/280 |
| 2012/0295601 | A1 | 11/2012 | Lang | |
| 2013/0088980 | A1* | 4/2013 | Kim | H04W 24/00 370/252 |
| 2013/0242730 | A1* | 9/2013 | Pelletier | H04W 28/0284 370/230 |
| 2013/0294363 | A1 | 11/2013 | Feng | |
| 2013/0294382 | A1* | 11/2013 | Xu | H04W 72/04 370/329 |
| 2015/0023335 | A1* | 1/2015 | Vermani | H04B 7/0452 370/338 |
| 2015/0319800 | A1* | 11/2015 | Park | H04W 76/15 370/329 |
| 2016/0073431 | A1* | 3/2016 | Park | H04W 72/1284 370/329 |
| 2016/0081101 | A1* | 3/2016 | Yu | H04W 52/0258 370/329 |
| 2016/0150566 | A1* | 5/2016 | Lee | H04W 74/085 370/329 |
| 2016/0295609 | A1* | 10/2016 | Vajapeyam | H04L 5/14 |
| 2017/0202025 | A1* | 7/2017 | Ouchi | H04W 76/28 |
| 2018/0205806 | A1* | 7/2018 | Ryu | H04L 5/026 |
| 2018/0235013 | A1* | 8/2018 | Jung | H04W 16/28 |
| 2019/0104549 | A1* | 4/2019 | Deng | H04B 7/0617 |

FOREIGN PATENT DOCUMENTS

| | | | |
|---|---|---|---|
| CN | 102447546 | A | 5/2012 |
| CN | 103178938 | A | 6/2013 |
| CN | 103582073 | A | 2/2014 |
| CN | 104640213 | A | 5/2015 |
| CN | 105307284 | A | 2/2016 |
| EP | 2645758 | A1 | 10/2013 |
| JP | 2014222882 | A | 11/2014 |
| JP | 2015537422 | A | 12/2015 |
| WO | 2012080845 | A2 | 6/2012 |
| WO | 2014055878 | A1 | 4/2014 |

OTHER PUBLICATIONS

"3rd Generation Partnership Project; Technical Specification Group Radio Access Network; UTRAN architecture for 3G Home Node B (HNB); Stage 2 (Release 12)", 3GPP Standard ; Technical Specification ; 3GPP TS 25.467, 3rd Generation Partnership Project (3GPP), Mobile Competence Centre; 650, Route Des Lucioles ; F-06921 Sophia-Antipolis Cedex ; France, vol. RAN WG3, No. V12.3.0, Dec. 24, 2014 (Dec. 24, 2014), pp. 1-91, XP051294120, [retrieved on Dec. 24, 2014].

Sharenote: "Rach", Dec. 4, 2015 (Dec. 4, 2015), pp. 1-28, XP055562615, Retrieved from the Internet:URL: https://web.archive.org/web/20151204185806/http://www.sharetechnote.com/html/RACH_LTE.html [retrieved on Feb. 27, 2019].

Supplementary European Search Report in the European application No. 15910010.6, dated Mar. 7, 2019.

English translation of the Written Opinion of the International Search Authority in the international application No. PCT/CN2015/096720, dated Aug. 26, 2016.

First Office Action of the Japanese application No. 2018-514300, dated Jun. 7, 2019.

First Office Action of the Chinese application No. 201580082307.3, dated Aug. 21, 2019.

* cited by examiner

METHOD AND APPARATUS FOR ESTABLISHING CONNECTION

RELATED APPLICATION

This application is an application under 35 U.S.C. 371 of International Application No. PCT/CN2015/096720 filed on Dec. 8, 2015, the entire contents of which are incorporated herein by reference.

TECHNICAL FIELD

Embodiments of the disclosure relate to the field of communications, and more particularly to a method and apparatus for establishing a connection.

BACKGROUND

In an existing Long Term Evolution (LTE) technology, a main flow that a terminal sends a connection establishment request through a random access process is as follows: the terminal selects a Preamble resource in Preamble resources broadcast by system information, and sends it to a base station; after receiving the resource, the base station confirms that there is a terminal required to access, and sends information of uplink resources, Cell Radio Network Temporary Identifier (C-RNTI) used by the terminal, uplink time synchronization and the like required by the connection establishment request to the terminal through a Random Access Response (RAR); after receiving the RAR, the terminal sends the connection establishment request according to the allocated uplink resources; and after receiving the connection establishment request, the base station copies request information, and sends it to the terminal through a collision resolution message (i.e. a message copying the connection establishment request).

Since an existing collision resolution message is 48 bits, a connection establishment request is limited to be 48 bits only. Therefore, content extension of the message is limited, and it is impossible to meet requirements of different network environments on connection establishment.

SUMMARY

The embodiments of the disclosure provide a method and apparatus for establishing a connection, which may be adapte to rapid connection establishment for different service requirements in multiple environments.

On a first aspect, a method for establishing a connection is provided, which may include that: terminal equipment determines a connection establishment request format adopted for sending a connection establishment request message from multiple connection establishment request formats; and the terminal equipment sends the connection establishment request message to network equipment according to the determined connection establishment request format.

On a second aspect, a method for establishing a connection is provided, which may include that: network equipment receives a connection establishment request message sent by terminal equipment, a format of the connection establishment request message being determined by the terminal equipment from multiple connection establishment request formats; and the network equipment sends a collision resolution message to the terminal equipment according to the format of the connection establishment request message.

On a third aspect, terminal equipment is provided, which may include: a determination module, configured to determine a connection establishment request format adopted for sending a connection establishment request message from multiple connection establishment request formats; and a sending module, configured to send the connection establishment request message to network equipment according to the determined connection establishment request format.

On a fourth aspect, network equipment is provided, which may include: a receiving module, configured to receive a connection establishment request message sent by terminal equipment, a format of the connection establishment request message being determined by the terminal equipment from multiple connection establishment request formats; a determination module, configured to determine a collision resolution message according to the format of the connection establishment request message; and a sending module, configured to send the collision resolution message to the terminal equipment.

On the basis of the abovementioned technical characteristics, according to the method and apparatus for establishing a connection provided by the embodiments of the disclosure, the terminal equipment may select one of the multiple connection establishment request formats for sending the connection establishment request message. In such a manner, rapid connection establishment for different service requirements in multiple environments may be adapted.

BRIEF DESCRIPTION OF DRAWINGS

In order to describe the technical solutions of the embodiments of the disclosure more clearly, the drawings required to be used in the embodiments of the disclosure will be simply introduced below. Obviously, the drawings described below are only some embodiments of the disclosure. Other drawings may further be obtained by those skilled in the art according to these drawings without creative work.

DETAILED DESCRIPTION

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those skilled in the art on the basis of the embodiments in the disclosure without creative work shall fall within the scope of protection of the disclosure.

It should be understood that the technical solutions of the embodiments of the disclosure may be applied to various communication systems, for example: an LTE system, an LTE Frequency Division Duplex (FDD) system, LTE Time Division Duplex (TDD), a Universal Mobile Telecommunication System (UMTS) and a future 5th-Generation (5G) communication system.

It should be understood that, in the embodiments of the disclosure, terminal equipment may also be called as user equipment (UE), a Mobile Station (MS), a mobile terminal and the like, and the UE may communicate with one or more core networks through a Radio Access Network (RAN). For example, the UE may be a mobile telephone (or called as a "cellular" telephone) and a computer with a mobile terminal, and for example, may be a portable, pocket, handheld, built-in-computer or vehicle-mounted mobile device, terminal equipment in a future 5G network or terminal equipment in a future evolved Public Land Mobile Network (PLMN).

It should also be understood that, in the embodiments of the disclosure, network equipment may be equipment configured to communicate with the terminal equipment. The network equipment may be a Base Transceiver Station (BTS) in a Global System of Mobile Communication (GSM) or Code Division Multiple Access (CDMA), may also be a NodeB (NB) in a Wideband Code Division Multiple Access (WCDMA) system, and may further be an Evolutional Node B (eNB or eNodeB) in an LTE system. Or, the network equipment may be a relay station, an access point, vehicle-mounted equipment, wearable equipment, network-side equipment in the future 5G network, the network equipment in the future evolved PLMN or the like.

Figure 1:
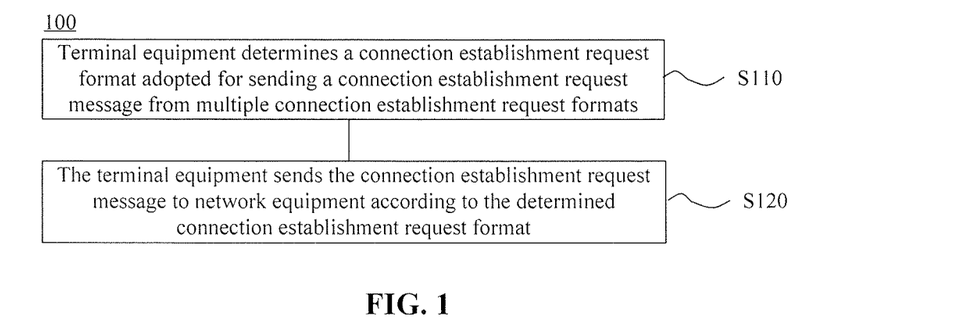
FIG. 1 is a schematic flowchart of a method for establishing a connection according to an embodiment of the disclosure.

FIG. 1 is a schematic flowchart of a method for establishing a connection according to an embodiment of the disclosure. As illustrated in FIG. 1, the method 100 includes the following operations.

In S110, terminal equipment determines a connection establishment request format adopted for sending a connection establishment request message from multiple connection establishment request formats.

In S120, the terminal equipment sends the connection establishment request message to network equipment according to the determined connection establishment request format.

Therefore, according to the method for establishing a connection of the embodiment of the disclosure, the terminal equipment may select one of the multiple connection establishment request formats for sending the connection establishment request message. In such a manner, rapid connection establishment for different service requirements in multiple environments may be adapted.

Optionally, the multiple connection establishment request formats may be specified by a standard or predetermined by the terminal equipment and the network equipment, and specific formats of the connection establishment request are not limited in the disclosure.

Optionally, in S110, the terminal equipment may determine the connection establishment request format adopted for sending the connection establishment request message according to at least one of the following parameters: a service requirement, a capability requirement or a network condition.

Specifically, the terminal equipment may select the connection establishment request format to be used according to own service requirement. For example, the terminal equipment may adopt a connection establishment request format when initiating a Voice over LTE (VoLTE) service, may adopt a connection establishment request format different from that adopted for initiating the VoLTE service when initiating a VoLTE video service, and may adopt a connection establishment request format the same as that adopted for a Device-to-Device (D2D) direct communication service when initiating a delay-insensitive service.

Moreover, the terminal equipment may further select the connection establishment request format to be used according to own capability requirement. For example, when a terminal is ordinary intelligent terminal equipment, a connection establishment request format different from that for a Machine Type Communication (MTC) terminal or a Vehicle to Vehicle (V2V) communication type terminal may be adopted. In addition, if the terminal equipment may support only one connection establishment request format, the same connection establishment request format may be adopted for different services, and if the terminal equipment supports multiple connection establishment request formats, different connection establishment request formats may be selected for different services.

Furthermore, the terminal equipment may select the connection establishment request format with reference to the network condition. Specifically, the terminal equipment may select different connection establishment request formats for different services only when the network equipment supports multiple connection establishment request formats.

In the embodiment of the disclosure, optionally, the terminal equipment may determine whether the network equipment supports multiple connection establishment request formats of connection establishment request message or not, and when it is determined that the network equipment supports multiple connection establishment request formats of connection establishment request message, determines the connection establishment request format adopted for sending the connection establishment request message from the multiple connection establishment request formats.

Optionally, the terminal equipment receives network condition indication information sent by the network equipment, and determines whether the network equipment supports multiple formats of the connection establishment request message according to the received network condition indication information. Specifically, the terminal equipment may receive a broadcast message sent by the network equipment, the broadcast message including the network condition indication information and the network condition indication information indicating whether the network equipment may support the multiple connection establishment request formats or not; or, the terminal equipment may receive a Radio Resource Control (RRC) connection establishment release message sent by the network equipment for a previous RRC, the RRC connection establishment release message including the network condition indication information; or, the terminal equipment may receive UE dedicated signaling sent by the network equipment, the UE dedicated signaling including the network condition indication information, for example, after reporting a UE capability to the network equipment, the terminal equipment may receive the UE dedicated signaling sent by the network equipment for information about the reported UE capability, and the UE dedicated signaling may include the network condition indication information; or, the terminal equipment receives a paging message sent by the network equipment, the paging message including the network condition indication information.

Optionally, as an example, the terminal equipment may receive a random access resource sent by the network equipment, and determine whether the network equipment supports multiple formats of the connection establishment request message according to the received random access resource. For example, if the random access resource received by the terminal equipment is a new Preamble-Group, which may be called as a PreambleGroupC or PreambleGroupD (different from existing PreambleGroupA and PreambleGroupB), it may be determined that the network equipment supports multiple formats of the connection establishment request message, otherwise it is determined that the network equipment may support connection establishment request messages in only one format.

Optionally, the random access resource is a Preamble-Group. Moreover, optionally, a root sequence of Preamble sequences in the PreambleGroup is different from a root sequence of Preamble sequences in the PreambleGroupA, and the root sequence of the Preamble sequences in the PreambleGroup is different from a root sequence of Preamble sequences in the PreambleGroupB. In other words, the new PreambleGroup may be distinguished from the PreambleGroupA and the PreambleGroupB by adopting different root sequences.

Or, a time-frequency resource location (i.e., time-frequency resources) occupied by the PreambleGroup is different from that occupied by the PreambleGroupA, and the time-frequency resource location occupied by the PreambleGroup is different from that occupied by the PreambleGroupB. In other words, the new PreambleGroup may be distinguished from the PreambleGroupA and the PreambleGroupB by adopting different time-frequency resource sending locations. The network equipment may indicate the time-frequency resource location occupied by the new PreambleGroup in a manner of sending indication information to the terminal equipment, and the network equipment may also predetermine the time-frequency resource location occupied by the new PreambleGroup with the terminal equipment. There are no limits made in the disclosure.

In the embodiment of the disclosure, optionally, the connection establishment request message sent by the terminal equipment includes at least one of an Identifier (ID) of the terminal equipment, a cause for connection establishment, a Non-Access Stratum (NAS), or a security key.

In the embodiment of the disclosure, optionally, the terminal equipment may send UE capability indication information indicating a connection establishment request format supported by the terminal equipment to the network equipment, so that the network equipment allocates uplink resources to the terminal equipment according to the UE capability indication information.

Moreover, the terminal equipment may further send the UE capability indication information to a Mobility Management Entity (MME), so that the MME configures the network equipment according to the UE capability indication information.

Figure 2:
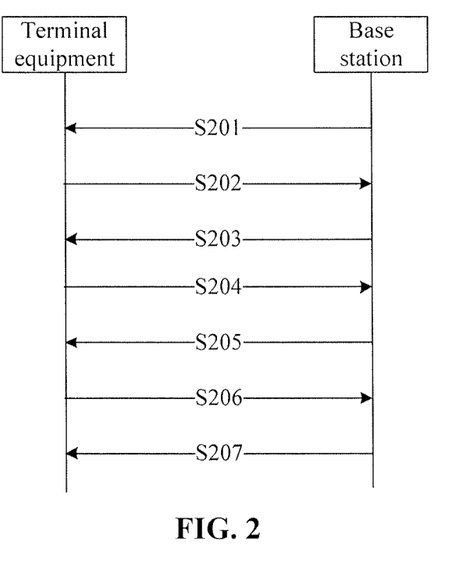
FIG. 2 is a schematic flowchart of a method for establishing a connection according to a specific embodiment of the disclosure.

FIG. 2 is a schematic flowchart of a method for establishing a connection according to a specific embodiment of the disclosure. As illustrated in FIG. 2, the method 200 includes the following operations.

In S201, terminal equipment receives a broadcast message sent by network equipment.

The broadcast message may include indication information indicating a network condition or Preamble configuration information.

In S202, the terminal equipment performs capability reporting to the network equipment.

The terminal equipment may send UE capability indication information to the network equipment to indicate whether it supports multiple connection establishment request formats and a supported connection establishment request format.

In S203, the network equipment sends UE dedicated signaling to the terminal equipment.

The UE dedicated signaling may include indication information indicating whether the network equipment supports multiple connection establishment request formats or the Preamble configuration information.

In S204, the terminal equipment sends a Preamble to the network equipment.

In S205, the network equipment sends an RAR message to the terminal equipment.

In S206, the terminal equipment sends a connection establishment request message to the network equipment.

In S207, the network equipment sends a connection establishment completion message to the terminal equipment.

Therefore, according to the method for establishing a connection of the embodiment of the disclosure, the terminal equipment may select one of the multiple connection establishment request formats for sending the connection establishment request message. In such a manner, rapid connection establishment for different service requirements in multiple environments may be adapted.

The method for establishing a connection according to the embodiment of the disclosure is described above in combination with FIG. 1 and FIG. 2 from a terminal equipment side in detail, and a method for establishing a connection according to another embodiment of the disclosure will be described below in combination with FIG. 3 and FIG. 4 from a network equipment side in detail. It should be understood that interactions and related characteristics and functions of the network equipment and terminal equipment described on the terminal equipment side correspond to descriptions on the network equipment side, and for simplicity, repeated descriptions are properly eliminated.

Figure 3:
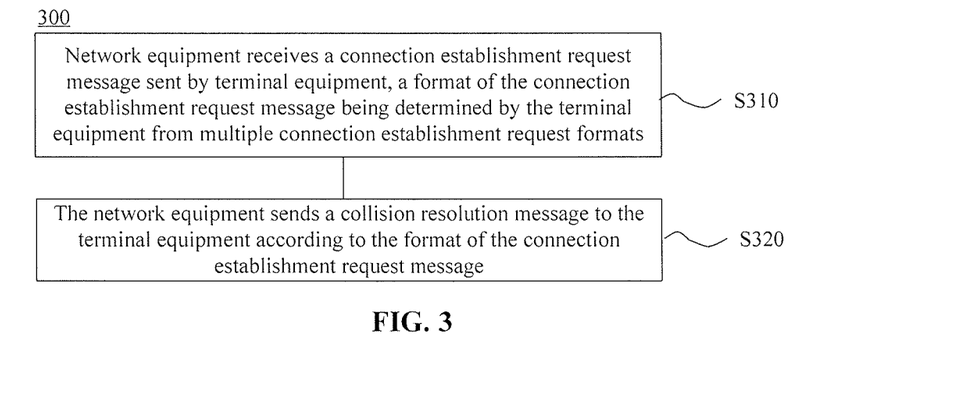
FIG. 3 is a schematic flowchart of a method for establishing a connection according to another embodiment of the disclosure.

FIG. 3 is a schematic flowchart of a method for establishing a connection according to another embodiment of the disclosure. As illustrated in FIG. 3, the method 300 includes the following operations.

In S310, network equipment receives a connection establishment request message sent by terminal equipment, a format of the connection establishment request message being determined by the terminal equipment from multiple connection establishment request formats.

In S320, the network equipment sends a collision resolution message to the terminal equipment according to the format of the connection establishment request message.

Therefore, according to the method for establishing a connection of the embodiment of the disclosure, the network equipment receives the connection establishment request message sent by the terminal equipment according to the determined connection establishment request format, and sends the collision resolution message to the terminal equipment according to the format of the connection establishment request message. In such a manner, rapid connection establishment for different service requirements in multiple environments may be adapted.

In the embodiment of the disclosure, optionally, the connection establishment request message includes at least one of an ID of the terminal equipment, a cause for connection establishment, a NAS, or a security key. Therefore, the connection establishment request format in the embodiment of the disclosure supports extension of content in the connection establishment request message, and rapid connection establishment for different service requirements in the multiple environments may be adapted.

In the embodiment of the disclosure, optionally, the network equipment may send network condition indication information to the terminal equipment, the network condition indication information being configured to indicate whether the network equipment supports multiple formats of the connection establishment request message, so that the terminal equipment determines the connection establishment request format for sending the connection establishment request message according to the network condition indication information.

In the embodiment of the disclosure, optionally, the network equipment may send a broadcast message to the terminal equipment, the broadcast message including the network condition indication information; or, the network equipment may send an RRC connection establishment release message for a previous RRC connection to the terminal equipment, the RRC connection establishment release message including the network condition indication information; or, the network equipment may send UE dedicated signaling to the terminal equipment, the UE dedicated signaling including the network condition indication information; or, the network equipment may send a paging message to the terminal equipment, the paging message including the network condition indication information.

Optionally, a network system may determine whether to send the network condition indication information to the terminal equipment by manual or automatic configuration and configure the network equipment (for example, a base station) through a southbound interface or a northbound interface; or, an MME may configure the network equipment (for example, the base station) by making statistics on an attached user number, user capabilities and user connection number in a network; or, the network equipment (for example, the base station) may make statistics on a number of connected users and a number of users trying for access in a cell under coverage, and determine (for example, the base station) to send the network condition indication information to the terminal equipment according to a statistical result, for example, the network equipment may send the network condition indication information to the terminal equipment when a ratio of the number of the connected users to the number of the users trying for access is higher than a certain numerical value; or, when being configured by the MME to send the network condition indication information to the terminal equipment, the network equipment may determine whether to send the network condition indication information to the terminal equipment according to the number of the connected users and number of the users trying for access in the cell under the coverage.

That is, the network equipment sends the network condition indication information to the terminal equipment when receiving first indication information sent by the MME; the network equipment determines whether to send the network condition indication information to the terminal equipment according to the number of the connected users and number of the users trying for access in the cell under the coverage of the network equipment.

Optionally, the network equipment may send a random access resource to the terminal equipment, and the random access resource may be a PreambleGroup.

Furthermore, optionally, a root sequence of Preamble sequences in the PreambleGroup is different from a root sequence of Preamble sequences in a PreambleGroupA, and the root sequence of the Preamble sequences in the PreambleGroup is different from a root sequence of Preamble sequences in a PreambleGroupB; or, a time-frequency resource location occupied by the PreambleGroup is different from that occupied by the PreambleGroupA, and the time-frequency resource location occupied by the PreambleGroup is different from that occupied by the PreambleGroupB.

Specifically, the network equipment may receive second indication information sent by the MME, the second indication information being configured to indicate a proportion of terminal equipment supporting multiple connection establishment request formats in the network, and determine a number of the Preamble sequences in the PreambleGroup according to the proportion. For example, the proportion of the terminal equipment supporting multiple connection establishment request formats in the network may be represented by a ratio of a number of the terminal equipment supporting multiple connection establishment request formats to a number of all attached terminal equipment, and the network equipment determines the number of the Preamble sequences according to the ratio. or, the proportion of the terminal equipment supporting multiple connection establishment request formats in the network may be represented by different grades (for example, high, medium and low), and it may be specified by a standard or specified in another manner that different grades correspond to different numbers of Preamble sequences, which will not form limits to the disclosure.

Figure 4:
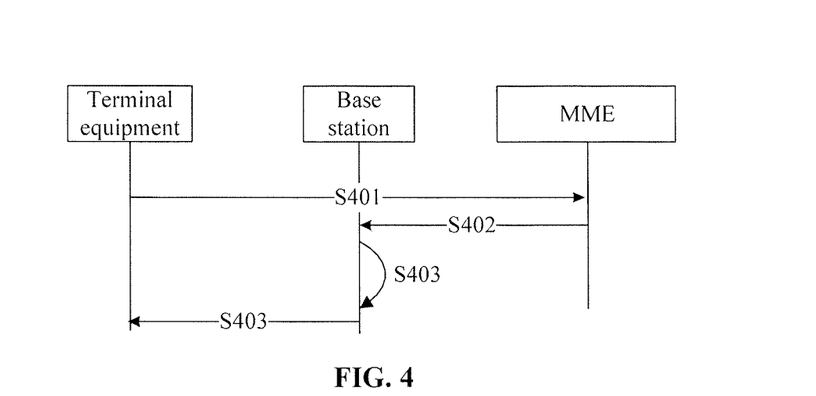
FIG. 4 is a schematic flowchart of a method for configuring a number of Preamble sequences in a Preamble Group according to a specific embodiment of the disclosure.

For example, FIG. 4 is a schematic flowchart of a method for configuring a number of Preamble sequences in a PreambleGroup according to an embodiment of the disclosure. As illustrated in FIG. 4, the method 400 includes the following operations.

In S401, the terminal equipment reports a UE capability to the MME.

The terminal equipment reports its own capability of whether supporting multiple connection establishment request formats to the MME.

In S402, the MME statistically calculates a proportion of a number of terminals supporting multiple connection establishment request formats in the network, and sends a result to the base station.

The MME may calculate the number of the terminals supporting multiple connection establishment request formats in the following manner: the number n of the terminals supporting multiple connection establishment request formats/a number N of all attached terminals.

In S403, the base station calculates a number of Preambles in a PreambleGroup required to be configured according to the received proportion sent by the MME.

In S404, the base station sends a specific configuration of the PreambleGroup to the terminal equipment.

The base station may send the specific configuration of the PreambleGroup to the terminal equipment through a broadcast message or UE dedicated signaling.

In the embodiment of the disclosure, optionally, the method 300 further includes that: the network equipment allocates uplink resources to the terminal equipment.

Optionally, the network equipment may receive UE capability indication information sent by the terminal equipment, and allocates the uplink resources to the terminal equipment according to the UE capability indication information. In other words, the network equipment stores capability information of the terminal equipment, the capability information including a connection establishment request format supported by the terminal equipment, and allocates corresponding uplink resources to the terminal equipment. Or, the network equipment may allocate the uplink resources to the terminal equipment according to a PreambleGroup to which Preamble sequences sent by the terminal equipment belong. In other words, by recognizing the Preamble sequences sent by the terminal equipment, the network equipment determines a random access resource group to which the Preamble sequences belongs, determines whether the terminal equipment adopts multiple connection establishment request formats, for example, a PreambleGroupC, and allocates the corresponding uplink resources to the terminal equipment. Or, the network equipment may allocate uplink resources of a preset size to the terminal equipment, and the uplink resources of the preset size may meet a resource requirement of a connection establishment request message corresponding to a connection establishment request format occupying a largest number of bits. In other words, the network equipment always allocates a maximum uplink resource for adaptation to a connection establishment request message in a largest format.

In the embodiment of the disclosure, optionally, the network equipment may determine a size of a collision resolution format according to a size of a connection establishment request format. For example, the network equipment may copy and send back part or all of the content in the connection establishment request message to the terminal equipment. For example, the network equipment may copy and send back the ID of the terminal equipment in the connection establishment request message to the terminal equipment, and simultaneously establish a dedicated data bearer (for example, a dedicated bearer is established for an emergency call) for a terminal service (for example, an emergency service) or allocate fixed resources to a D2D/V2V user.

Therefore, according to the method for establishing a connection of the embodiment of the disclosure, the network equipment receives the connection establishment request message sent by the terminal equipment according to the determined connection establishment request format, and sends the collision resolution message to the terminal equipment according to the format of the connection establishment request message. In such a manner, rapid connection establishment for different service requirements in the multiple environments may be adapted.

Figure 5:
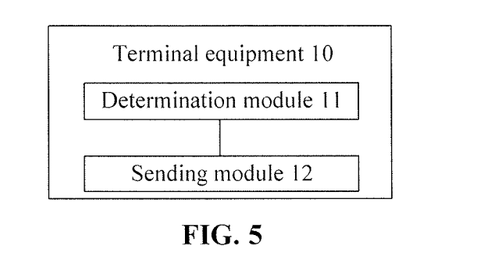
FIG. 5 is a schematic block diagram of terminal equipment according to an embodiment of the disclosure.

FIG. 5 is a schematic block diagram of terminal equipment according to an embodiment of the disclosure. As illustrated in FIG. 5, the terminal equipment 10 includes:
  a determination module 11, configured to determine a connection establishment request format adopted for sending a connection establishment request message from multiple connection establishment request formats; and
  a sending module 12, configured to send the connection establishment request message to network equipment according to the determined connection establishment request format.

Therefore, the terminal equipment of the embodiment of the disclosure may select one of the multiple connection establishment request formats for sending the connection establishment request message. In such a manner, rapid connection establishment for different service requirements in multiple environments may be adapted.

In the embodiment of the disclosure, optionally, the determination module 11 is specifically configured to: determine the connection establishment request format adopted for sending the connection establishment request message according to at least one of the following parameters: a service requirement, a capability requirement or a network condition.

In the embodiment of the disclosure, optionally, the determination module 11 is further configured to:
  determine whether the network equipment supports multiple formats of the connection establishment request message; and
  when it is determined that the network equipment supports multiple formats of the connection establishment request message, determine the connection establishment request format adopted for sending the connection establishment request message from the multiple connection establishment request formats.

Figure 6:
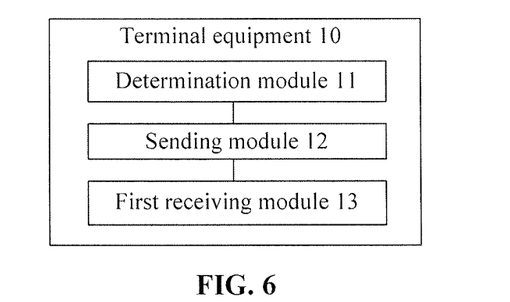
FIG. 6 is another schematic block diagram of terminal equipment according to an embodiment of the disclosure.

In the embodiment of the disclosure, optionally, as illustrated in FIG. 6, the terminal equipment further includes: a first receiving module 13, configured to receive network condition indication information sent by the network equipment,
  wherein the determination module 11 is configured to: determine whether the network equipment supports multiple formats of the connection establishment request message according to the network condition indication information.

In the embodiment of the disclosure, optionally, the first receiving module 13 is specifically configured to:
  receive a broadcast message sent by the network equipment, the broadcast message including the network condition indication information; or,
  receive an RRC connection establishment release message sent by the network equipment for a previous RRC connection, the RRC connection establishment release message including the network condition indication information; or,
  receive UE dedicated signaling sent by the network equipment, the UE dedicated signaling including the network condition indication information; or,
  receive a paging message sent by the network equipment, the paging message including the network condition indication information.

Figure 7:
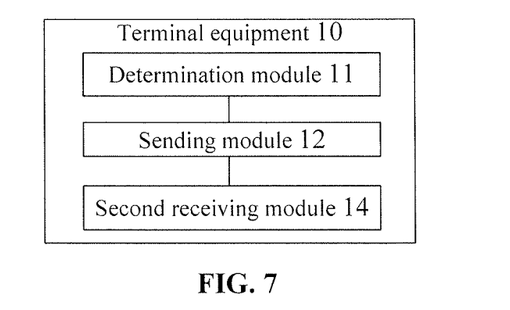
FIG. 7 is another schematic block diagram of terminal equipment according to an embodiment of the disclosure.

In the embodiment of the disclosure, optionally, as illustrated in FIG. 7, the terminal equipment further includes: a second receiving module 14, configured to receive a random access resource sent by the network equipment,
  wherein the determination module 11 is further configured to: determine whether the network equipment supports multiple formats of the connection establishment request message according to the random access resource.

In the embodiment of the disclosure, optionally, the random access resource is a PreambleGroup.

In the embodiment of the disclosure, optionally, a root sequence of Preamble sequences in the PreambleGroup is different from a root sequence of Preamble sequences in a PreambleGroupA, and the root sequence of the Preamble sequences in the PreambleGroup is different from a root sequence of Preamble sequences in a PreambleGroupB; or,
  a time-frequency resource location occupied by the PreambleGroup is different from that occupied by the PreambleGroupA, and the time-frequency resource location occupied by the PreambleGroup is different from that occupied by the PreambleGroupB.

In the embodiment of the disclosure, optionally, the connection establishment request message includes at least one of an ID of the terminal equipment, a cause for connection establishment, a NAS message, or a security key.

In the embodiment of the disclosure, optionally, the sending module 12 is further configured to: send UE capability indication information to the network equipment, the UE capability indication information indicating a connection establishment request format supported by the terminal equipment, so that the network equipment allocates uplink resources to the terminal equipment according to the UE capability indication information.

In the embodiment of the disclosure, optionally, the sending module 12 is further configured to: send the UE capability indication information to an MME for the MME to configure the network equipment according to the UE capability indication information.

Figure 8:
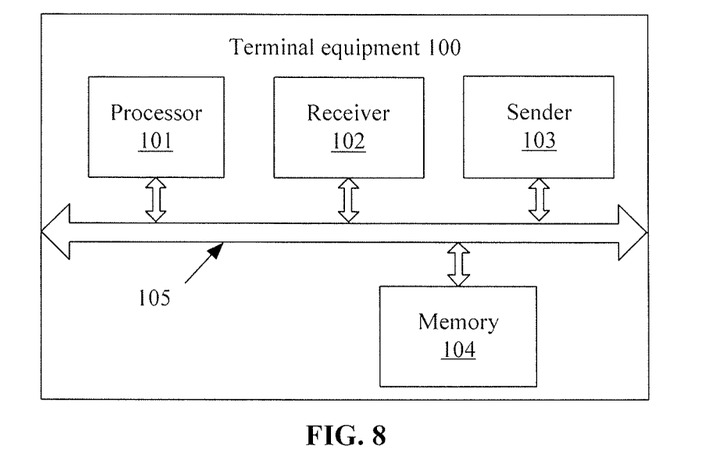
FIG. 8 is a schematic block diagram of terminal equipment according to another embodiment of the disclosure.

It is important to note that, in the embodiment of the disclosure, the determination module 11 may be implemented by a processor, a sending module 12 may be implemented by a sender, and the first receiving module 13 and the second receiving module 14 may be implemented by a receiver. As illustrated in FIG. 8, terminal equipment 100 may include a processor 101, a receiver 102, a sender 103 and a memory 104, wherein the memory 104 may be configured to store codes executed by the processor 101 and the like.

Each component in the terminal equipment 100 is coupled together through a bus system 105, wherein the bus system 105 includes a data bus, and further includes a power bus, a control bus and a state signal bus.

The terminal equipment 10 illustrated in FIG. 5 to FIG. 7 or the terminal equipment 100 illustrated in FIG. 8 may implement each process executed by the terminal equipment in the embodiment of FIG. 1, which will not be elaborated herein to avoid repetition.

Figure 9:
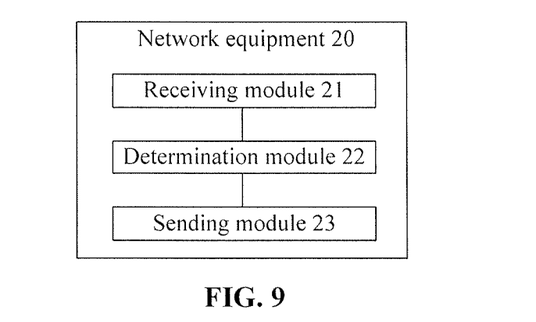
FIG. 9 is a schematic block diagram of network equipment according to an embodiment of the disclosure.

FIG. 9 is a schematic block diagram of network equipment according to an embodiment of the disclosure. As illustrated in FIG. 9, the network equipment 20 includes:
a receiving module 21, configured to receive a connection establishment request message sent by terminal equipment, a format of the connection establishment request message being determined by the terminal equipment from multiple connection establishment request formats;
a determination module 22, configured to determine a collision resolution message according to the format of the connection establishment request message; and
a sending module 23, configured to send the collision resolution message to the terminal equipment.

Therefore, the network equipment of the embodiment of the disclosure receives the connection establishment request message sent by the terminal equipment according to the determined connection establishment request format, and sends the collision resolution message to the terminal equipment according to the format of the connection establishment request message. In such a manner, rapid connection establishment for different service requirements in multiple environments may be adapted.

In the embodiment of the disclosure, optionally, the sending module 23 is further configured to: send network condition indication information to the terminal equipment, the network condition indication information being configured to indicate whether the network equipment supports multiple formats of the connection establishment request message, so that the terminal equipment determines the connection establishment request format for sending the connection establishment request message according to the network condition indication information.

In the embodiment of the disclosure, optionally, the sending module 23 is specifically configured to:
send a broadcast message to the terminal equipment, the broadcast message including the network condition indication information; or,
send an RRC connection establishment release message for a previous RRC connection to the terminal equipment, the RRC connection establishment release message including the network condition indication information; or,
send UE dedicated signaling to the terminal equipment, the UE dedicated signaling including the network condition indication information; or,
send a paging message to the terminal equipment, the paging message including the network condition indication information.

In the embodiment of the disclosure, optionally, the sending module 23 is configured to: when the receiving module receives first indication information sent by an MME, send the network condition indication information to the terminal equipment; or,
the determination module 22 is further configured to determine whether to send the network condition indication information to the terminal equipment according to a number of connected users and a number of users trying for access in a cell under coverage of the network equipment.

In the embodiment of the disclosure, optionally, the sending module 23 is further configured to: send a random access resource to the terminal equipment.

In the embodiment of the disclosure, optionally, the random access resource is a PreambleGroup.

In the embodiment of the disclosure, optionally, a root sequence of Preamble sequences in the PreambleGroup is different from a root sequence of Preamble sequences in a PreambleGroupA, and the root sequence of the Preamble sequences in the PreambleGroup is different from a root sequence of Preamble sequences in a PreambleGroupB; or,
a time-frequency resource location occupied by the PreambleGroup is different from that occupied by the PreambleGroupA, and the time-frequency resource location occupied by the PreambleGroup is different from that occupied by the PreambleGroupB.

In the embodiment of the disclosure, optionally, the receiving module 21 is further configured to: receive second indication information sent by the MME, the second indication information being configured to indicate a proportion of terminal equipment supporting multiple connection establishment request formats in a network,
wherein the determination module 22 is further configured to determine a number of the Preamble sequences in the PreambleGroup according to the proportion.

In the embodiment of the disclosure, optionally, the determination module 22 is further configured to: allocate uplink resources to the terminal equipment.

In the embodiment of the disclosure, optionally, the receiving module 21 is configured to: receive UE capability indication information sent by the terminal equipment,
wherein the determination module 22 is further configured to:
allocate the uplink resources to the terminal equipment according to the UE capability indication information; or, allocate the uplink resources to the terminal equipment according to a PreambleGroup to which a Preamble sequence sent by the terminal equipment belongs; or, allocate uplink resources of a preset size to the terminal equipment, wherein the uplink resources of the preset size may meet a resource requirement of a connection establishment request message corresponding to a connection establishment request format occupying a largest number of bits.

In the embodiment of the disclosure, optionally, the connection establishment request message includes at least the following of an ID of the terminal equipment, a cause for connection establishment, a NAS message, or a security key.

Figure 10:
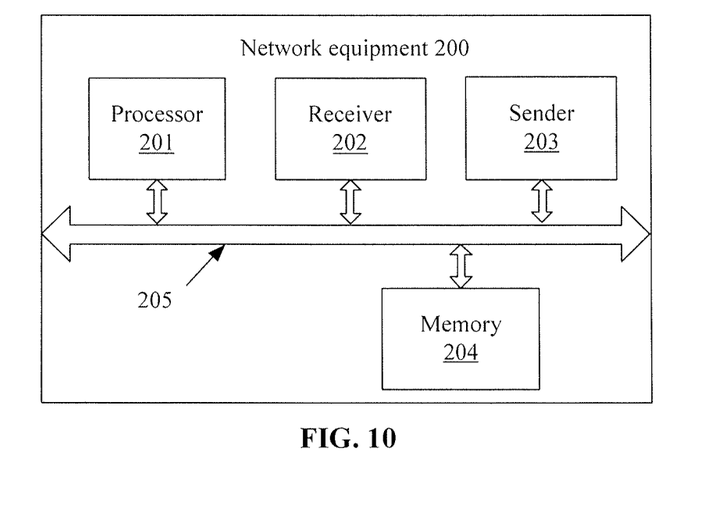
FIG. 10 is a schematic block diagram of network equipment according to another embodiment of the disclosure.

It is important to note that, in the embodiment of the disclosure, the receiving module 21 may be implemented by a receiver, the determination module 22 may be implemented by a processor, and the sending module 23 may be implemented by a sender. As illustrated in FIG. 10, network equipment 200 may include a processor 201, a receiver 202, a sender 203 and a memory 204, wherein the memory 204 may be configured to store codes executed by the processor 201 and the like.

Each component in the network equipment 200 is coupled together through a bus system 205, wherein the bus system 205 includes a data bus, and further includes a power bus, a control bus and a state signal bus.

The network equipment 20 illustrated in FIG. 9 or the network equipment 200 illustrated in FIG. 10 may implement each process executed by the network equipment in the embodiment of FIG. 3, which will not be elaborated herein to avoid repetition.

Those skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Those skilled in the art may realize the described functions for each specific application by virtue of different methods, but such realization shall fall within the scope of the disclosure.

Those skilled in the art may clearly learn about that specific operations of the system, device and unit described above may refer to the corresponding processes in the method embodiments for convenient and brief description and will not be elaborated herein.

In some embodiments provided by the disclosure, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being implemented in form of software function unit and sold or used as an independent product, the function may also be stored in a computer-readable storage medium. Based on such an understanding, the technical solutions of the disclosure substantially or parts making contributions to a conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation modes of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for establishing a connection, comprising:
   determining, by terminal equipment, a connection establishment request format adopted for sending a connection establishment request message from multiple connection establishment request formats; and
   sending, by the terminal equipment, the connection establishment request message to network equipment according to the determined connection establishment request format;
   wherein the method further comprises:
   receiving, by the terminal equipment, a random access resource sent by the network equipment; and
   determining, by the terminal equipment, whether the network equipment supports the multiple formats of the connection establishment request message according to the random access resource;
   wherein the random access resource is a PreambleGroup, a root sequence of Preamble sequences in the PreambleGroup is different from a root sequence of Preamble sequences in a PreambleGroupA, and the root sequence of the Preamble sequences in the PreambleGroup is different from a root sequence of Preamble sequences in a PreambleGroupB; or,
   a time-frequency resource location occupied by the PreambleGroup is different from that occupied by the PreambleGroupA, and the time-frequency resource location occupied by the PreambleGroup is different from that occupied by the PreambleGroupB.

2. The method according to claim 1, wherein determining, by the terminal equipment, the connection establishment request format adopted for sending the connection establishment request message from the multiple connection establishment request formats comprises:

determining, by the terminal equipment, the connection establishment request format adopted for sending the connection establishment request message according to the network condition and at least one of the following parameters: a service requirement or a capability requirement.

3. The method according to claim 1,
wherein determining, by the terminal equipment, the connection establishment request format adopted for sending the connection establishment request message from the multiple connection establishment request formats comprises:
when it is determined that the network equipment supports the multiple formats of the connection establishment request message, determining, by the terminal equipment, the connection establishment request format adopted for sending the connection establishment request message from the multiple connection establishment request formats.

4. The method according to claim 3, further comprising:
receiving, by the terminal equipment, network condition indication information sent by the network equipment; and
determining, by the terminal equipment, whether the network equipment supports the multiple formats of the connection establishment request message according to the network condition indication information.

5. The method according to claim 4, wherein receiving, by the terminal equipment, the network condition indication information sent by the network equipment comprises:
receiving a broadcast message sent by the network equipment, the broadcast message comprising the network condition indication information; or,
receiving a Radio Resource Control (RRC) connection establishment release message sent by the network equipment for a previous RRC connection, the RRC connection establishment release message comprising the network condition indication information; or,
receiving UE dedicated signaling sent by the network equipment, the UE dedicated signaling comprising the network condition indication information; or,
receiving a paging message sent by the network equipment, the paging message comprising the network condition indication information.

6. The method according to claim 1, wherein the connection establishment request message comprises at least one of the following: an Identifier (ID) of the terminal equipment, a cause for connection establishment, a Non-Access Stratum (NAS) message, or a security key.

7. The method according to claim 1, further comprising:
sending, by the terminal equipment, UE capability information to the network equipment, the UE capability information indicating a connection establishment request format supported by the terminal equipment and being used by the network equipment to allocate uplink resources to the terminal equipment.

8. The method according to claim 1, further comprising:
sending, by the terminal equipment, the UE capability information to a Mobility Management Entity (MME), the UE capability information being used by the MME to configure the network equipment.

9. The method according to claim 1, wherein determining, by the terminal equipment, the connection establishment request format adopted for sending the connection establishment request message from the multiple connection establishment request formats comprises:

determining, by the terminal equipment, the connection establishment request format adopted for sending the connection establishment request message from the multiple connection establishment request formats supported by the network equipment.

10. A method for establishing a connection, comprising:
receiving, by network equipment, a connection establishment request message sent by terminal equipment, a format of the connection establishment request message being determined by the terminal equipment from multiple connection establishment request formats;
sending, by the network equipment, a collision resolution message to the terminal equipment according to the format of the connection establishment request message;
wherein the method further comprises:
sending, by the network equipment, a random access resource to the terminal equipment;
wherein the random access resource is a PreambleGroup, a root sequence of Preamble sequences in the PreambleGroup is different from a root sequence of Preamble sequences in a PreambleGroupA, and the root sequence of the Preamble sequences in the PreambleGroup is different from a root sequence of Preamble sequences in a PreambleGroupB; or,
a time-frequency resource location occupied by the PreambleGroup is different from that occupied by the PreambleGroupA, and the time-frequency resource location occupied by the PreambleGroup is different from that occupied by the PreambleGroupB.

11. The method according to claim 10, further comprising:
sending, by the network equipment, network condition indication information to the terminal equipment, the network condition indication information indicating whether the network equipment supports multiple formats of the connection establishment request message and being used by the terminal equipment to determine the connection establishment request format for sending the connection establishment request message.

12. The method according to claim 11, wherein sending, by the network equipment, the network condition indication information to the terminal equipment comprises:
sending a broadcast message to the terminal equipment, the broadcast message comprising the network condition indication information; or,
sending a Radio Resource Control (RRC) connection establishment release message for a previous RRC connection to the terminal equipment, the RRC connection establishment release message comprising the network condition indication information; or,
sending UE dedicated signaling to the terminal equipment, the UE dedicated signaling comprising the network condition indication information; or,
sending a paging message to the terminal equipment, the paging message comprising the network condition indication information.

13. The method according to claim 11, wherein sending, by the network equipment, the network condition indication information to the terminal equipment comprises:
when receiving first indication information sent by a Mobility Management Entity (MME), sending, by the network equipment, the network condition indication information to the terminal equipment; or,
determining, by the network equipment, whether to send the network condition indication information to the terminal equipment according to a number of connected users and a number of users trying for access in a cell under coverage of the network equipment.

14. The method according to claim 10, further comprising:
receiving, by the network equipment, second indication information sent by the MME, the second indication information indicating a proportion of terminal equipment supporting multiple connection establishment request formats in a network; and
determining, by the network equipment, a number of the Preamble sequences in the PreambleGroup according to the proportion.

15. The method according to claim 10, further comprising:
allocating, by the network equipment, uplink resources to the terminal equipment.

16. The method according to claim 15, wherein allocating, by the network equipment, the uplink resources to the terminal equipment comprises:
receiving, by the network equipment, UE capability information sent by the terminal equipment, and
allocating the uplink resources to the terminal equipment according to the UE capability information; or,
allocating, by the network equipment, the uplink resources to the terminal equipment according to a PreambleGroup to which Preamble sequences sent by the terminal equipment belong; or,
allocating, by the network equipment, uplink resources of a preset size to the terminal equipment, wherein the uplink resources of the preset size meet a resource requirement of a connection establishment request message corresponding to a connection establishment request format occupying a largest number of bits.

17. Terminal equipment, comprising: a memory, a processor, and a computer program stored on the memory and capable of running on the processor, wherein the computer program, when executed by the processor, cause the processor to execute operations comprising:
determining a connection establishment request format adopted for sending a connection establishment request message from multiple connection establishment request formats; and
sending the connection establishment request message to network equipment according to the determined connection establishment request format;
wherein the operations further comprises:
receiving a random access resource sent by the network equipment; and
determining whether the network equipment supports the multiple formats of the connection establishment request message according to the random access resource;
wherein the random access resource is a PreambleGroup, a root sequence of Preamble sequences in the PreambleGroup is different from a root sequence of Preamble sequences in a PreambleGroupA, and the root sequence of the Preamble sequences in the PreambleGroup is different from a root sequence of Preamble sequences in a PreambleGroupB; or,
a time-frequency resource location occupied by the PreambleGroup is different from that occupied by the PreambleGroupA, and the time-frequency resource location occupied by the PreambleGroup is different from that occupied by the PreambleGroupB.

* * * * *